United States Patent Office 2,896,411
Patented July 28, 1959

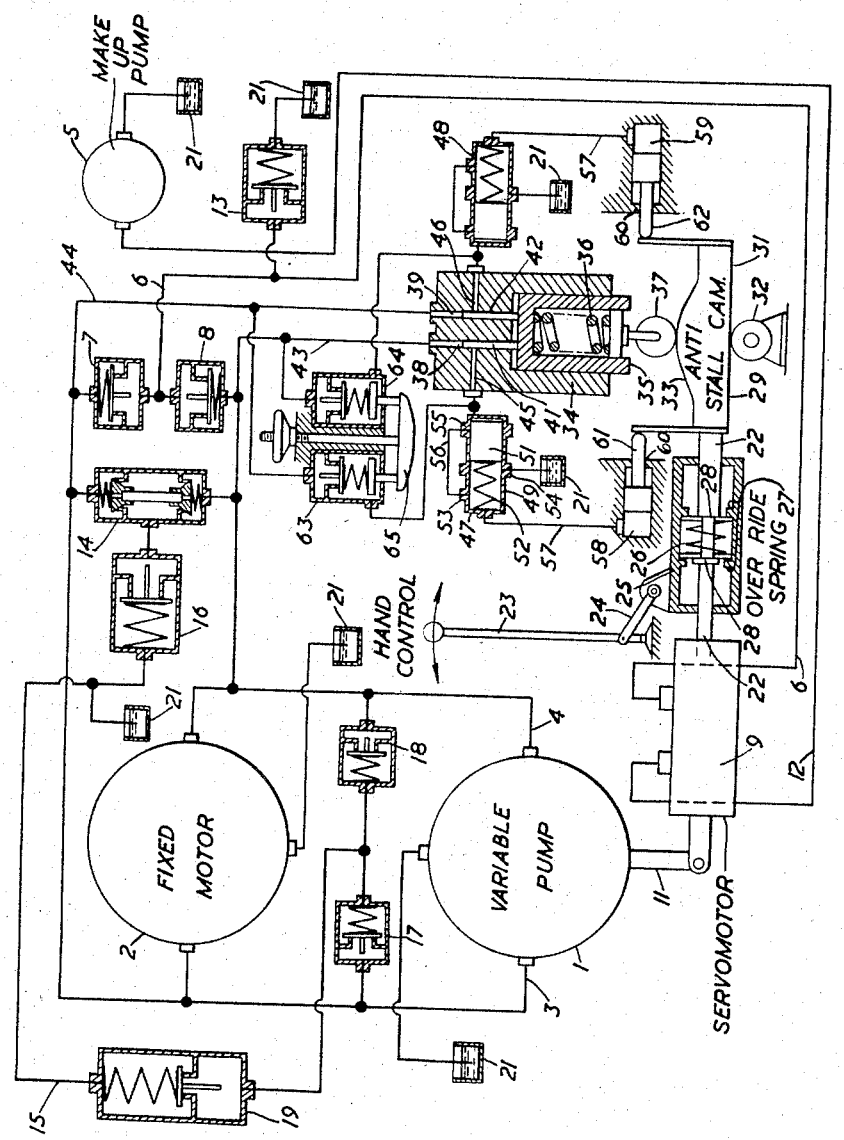

2,896,411
HYDRAULIC POWER TRANSMISSION

Eric H. Bowers, Cheltenham, England, and Oswald Thoma, Grunwald uber Munich, Germany, assignors to Dowty Hydraulic Units Limited, Tewkesbury, England, and Oswald Thoma, Grunwald uber Munich, Germany Application December 19, 1957, Serial No. 704,217

Claims priority, application Great Britain December 21, 1956

9 Claims. (Cl. 60—53)

This invention relates to a hydraulic power transmission for use between a prime mover and a mechanical load of the kind in which a variable positive displacement hydraulic pump is driven by the prime mover and the pumped liquid is fed to a positive displacement hydraulic motor which in turn drives the mechanical load. The invention, although of general application, is more particularly useful for hydraulic transmissions in agricultural tractors or other vehicles where the gear ratio adjustment is frequently varied to meet varying conditions. A low gear drive is obtained by reducing the pump displacement but if there is high resistance to movement of the driving wheels the hydraulic pressure can become extremely high and the transmission may be damaged. A simple pressure relief valve in the hydraulic system would prevent this damage, but the difficulty would then arise that when the relief valve opens the whole hydraulic power developed by the pump would be dissipated in the liquid as heat causing the liquid to attain an objectionably high temperature.

One object of the present invention is to provide a means for relieving excessively high pressures arising in a transmission of the kind referred to without excessive generation of heat in the liquid or wastage of power of the prime mover. This is accomplished by the use of a means sensitive to pressure in the pump-motor circuit, acting automatically to reduce pump displacement, overriding the manual control thereof. This pressure sensitive means is one of three such means, termed herein the first pressure sensitive means. Another is a substantial duplicate of the first, but functioning during reverse operation, and is herein termed the third pressure sensitive means. It also functions in conjunction with the first during braking whilst the tractor and its motor tend to drive the pump and prime mover. The second pressure sensitive means will be identified later.

Further, in a transmission of the kind referred to, particularly when used on a tractor, it is possible through unskilled manipulation of the manual pump displacement control to select an excessively high gear, i.e. large pump displacement, for a particular set of circumstances whereby the prime mover or engine is overloaded or stalled. The circumstances in which this might occur are if excessive rates of acceleration are attempted, excessive slopes are attempted, or excessive loads are applied to the tractor or a combination of any of these. The stalling pressure is of course variable throughout the range of pump displacement.

A further object of the present invention is to provide means whereby the possibility of engine stalling or prime mover overloading is removed over the whole range of pump displacement settings.

In accordance with the present invention in a transmission of the kind referred to, there is provided manual means to control pump displacement and a first pressure sensitive means fed with pump output pressure to act in an overriding sense on the pump displacement to reduce the latter if the pressure exceeds a certain value, this certain value increasing with reduction of pump displacement over a part or all of the range of pump displacement adjustment. Preferably, a further or second pressure sensitive means is provided which may be pre-set to a maximum pressure consistent with the maximum torque which may be exerted on the load by the motor and which overrides both the manual means and the first pressure sensitive means to reduce pump displacement if the pressure rises above the preset value. The prime mover with which the invention is employed may be of any conventional type controlled in any manner such for example as running at a constant speed irrespective of power output or manually controlled to run at variable speed and variable power output. The prime mover with which the invention will prove most useful is a diesel engine having the normal kind of manual control which acts to adjust engine running speed through the medium of a governor. Such an engine usually operates at an approximately constant torque over its speed range, power output being increased by increasing the selected engine speed. With the present invention in use, for example on an agricultural diesel tractor where the engine power output and the gear ratio to the driving wheels require to be frequently adjusted, only three controls are necessary to drive the tractor, firstly tractor steering, secondly gear ratio control, and thirdly, engine speed control. As compared with the normal tractor all need for simultaneous declutching with gear changing is entirely eliminated, the driver merely selecting the appropriate engine power and gear ratio for any particular operation. Any errors of judgment by the driver in selecting either of these two controls cannot by the operation of the invention cause damage to the transmission or stalling of the engine.

One embodiment of the invention will now be described by way of example with reference to the accompanying diagrammatic drawing which represents the transmission in circuit form between the engine and the wheels of a tractor, the elements of the transmission being shown diagrammatically. The diagram is intended to illustrate the case wherein the transmission is reversible for either direction of operation, but the invention is suited to reversible or to unidirectional operation, and if the operation is to be unidirectional certain duplicated elements may be omitted. The claims are intended to include either case.

In this drawing the variable delivery pump is shown at 1 and the hydraulic motor is shown at 2. A pair of pipes 3 and 4 interconnect the pump and motor to form the main passage for flow of hydraulic liquid. This basic circuit is referred to as the main circuit. To maintain the main circuit primed with liquid a small make-up pump 5 is provided which is driven by the prime mover driving the pump 1 and which delivers low pressure liquid by a path subsequently made clear through pipe line 6 to a pair of non-return valves 7 and 8 which are connected to the pipe lines 3 and 4 respectively. It will be seen that whichever of the lines 3 or 4 is under pressure then the associated non-return valve 7 or 8 will remain closed and make-up liquid will be supplied as needed through the other non-return valve. The power output of the make-up pump is also employed in this circuit diagram for the operation of a servo motor 9 which controls the pump displacement control 11 of pump 1. The servo motor 9 in this invention is so arranged that make-up liquid pumped by the pump 5 passes from pipe line 12 continuously through the servo motor for feeding by way of pipe line 6 to the main circuit. This affords the priming path for the main circuit referred to hereinabove. To main a definite low pressure in the liquid delivered by pump 5 a pressure relief valve 13 is provided in the line 6. Further, a shuttle valve 14 is provided which is connected between the pipe lines 3 and 4 and which is arranged to deliver to a pipe 15 liquid from whichever of the pipes 3 or 4 is at the lower pressure. This liquid from pipe 15 passes through a low pressure relief valve 16 which in effect determines the lower pressure existing in the pipe lines 3 or 4. Two non-return valves 17 and 18 extend from the pipe lines 3 and 4 to a high pressure relief valve 19 whose function is to limit the highest pressure that may be developed in the main circuit. This valve 19 forms a final safeguard to prevent damage to the transmission and is set at a pressure slightly below the maximum that the main circuit could withstand. To simplify the diagram the connections back to the rservoir of hydraulic liquid have been shown diagrammatically at the various circuit elements where they are connected and for convenience all reservoir connections are indicated by the references 21. It will be appreciated that these all extend to the same reservoir.

Having described the general arrangement of the transmission the apparatus in accordance with the invention will now be described. For control of the displacement of pump 1 a control rod 22 is provided extending from the servo motor 9, movement of this control rod being faithfully reproduced with greater power on the pump displacement control 11. Basic operation of the rod 22 is controlled by a hand control lever 23 from which a connecting link 24 extends to the cage 25 of a caged spring 26. The arrangement of the cage 25 is such that movement of the rod 22 in either direction from a neutral position is obtained by transmission of the force from lever 23 through the spring 26. This is accomplished by means of stops 27 internally of the cage and shoulders 28 on the rod 22. From the cage 25 the rod 22 extends in the opposite direction from the servo motor to a cam 29. This cam is designed for linear travel and its lower edge 31 is straight and runs on a roller 32. The upper edge 33 of the cam is shaped to carry out the cam function. Above the cam 29 a casing 34 is provided in which a hollow plunger 35 is slidably mounted. Within this plunger a compression spring 36 is located pressing at one end against the plunger 35 and at the other end against a roller 37 which engages the cam surface 33. In the casing 34 above the upper end of plunger 35 a pair of cylinders 38 and 39 (assuming reversible operation is intended) are provided in which are located pistons 41 and 42, each of which are adapted to press against the upper end of plunger 35 as a result of liquid pressure in the cylinders 38 and 39. Pipes 43 and 44 connect cylinders 38 and 39 respectively to the pipe lines 4 and 3 of the main circuit. Ports 45 and 46 extend from the cylinders 38 and 39 and connect respectively to vent valves 47 and 48. Each vent valve comprises a cylinder 49 in which a piston 51 is located urged to one end of the cylinder by a spring 52. In the wall of the cylinder 49 three ports 53, 54 and 55 are located. The piston 51 under spring action normally closes the port 55. A connecting pipe 56 interconnects ports 53 and 55 whilst a pipe connection 57 extends from the end of the cylinder opposite that one to which the passage 45 or 46 is connected. The pipe 57 in the case of valve 47 connects to a cylinder 58 whilst in the case of valve 48 the pipe 57 connects to a cylinder 59. In the event that a high pressure exists in the lines 43 or 44 sufficient to depress the pistons 41 or 42 so that either of the passages 45 or 46 is connected to the high pressure then this pressure will act on the piston 51 of the valve 47 or 48 to compress spring 52 to close the port 54 which leads to reservoir 21 and to connect passage 45 or 46 through pipe 56 to the pipe 57.

Within the cylinders 58 and 59 pistons 61 and 62 are provided which are so arranged as to press oppositely on opposite ends of the cam 29 such that when pressure is fed to either of cylinders 58 and 59 the cam will be moved in an overriding sense having regard to the displacement of the hand control 23, this overriding movement allowed by the compression of spring 26. Stops 60 on each cylinder prevent either piston from moving the cam and rod 22 beyond the zero displacement position. Cylinders 58 and 59 and pistons 61 and 62 form a double-acting ram arrangement. It will be seen that any double-acting ram may be substituted in place of the two pistons and cylinders as shown.

A pair of spring-loaded valves 63 and 64 connect respectively from the pipes 44 and 43 to the passages 45 and 46. The spring loadings of both of these valves 63 and 64 are simultaneously adjustable, as by means of a preset screw arrangement 65, the opening pressures of either of these valves being in the order of the higher pressures developed by the pump 1.

Assuming that the transmission and control arrangement as described are installed on a tractor, then for normal operation a displacement of the hand control lever 23 is selected in conjunction with an engine power setting to cause the tractor to accomplish any particular task. If under any circumstances the driver selects too large a displacement of the pump by means of lever 23 it would normally be expected that the engine would stall. However, with the control arrangement of the invention since the selection of too large a displacement would involve an excessive pressure, the appropriate piston 41 or 42 being fed with this pressure will depress the plunger 35 to the extent that pressure liquid is fed to the passage 45 or 46. In the arrangement shown in the drawings movement of the hand control lever to the right represents forward tractor movement and movement to the left represents reverse tractor movement. If the hand control lever is moved excessively towards the right the pipe line 3 will be under high pressure, this pressure passing through pipe 44 to cause depression of piston 42 and the plunger 35 to allow liquid to be fed through passage 46, valve 48 to cylinder 59 to exert pressure on piston 62 to move the cam 29 to the left thus reducing pump displacement and overriding the action of the control lever 23. Reduction of pump displacement will not necessarily cause a reduction in pressure in the system, but the roller 37 will be moved up the cam surface 33 to put more load on to spring 36 to the extent that the piston 42 now closes the passage 46. The piston 42, spring 36, piston 62 and cylinder 59 then form the first pressure sensitive means. When the passage 46 is closed the spring 52 in valve 48 will push the piston 51 to close port 53 and open port 54 thus relieving pressure behind piston 62, but assuming that the excessive movement on lever 23 is maintained the pump displacement will tend to increase by reason of such excessive movement until plunger 42 is again depressed to feed pressure liquid into the cylinder 59. A position of balance is thus established maintaining pressure in cylinder 59 such that the displacement of the pump is reduced from that selected by the lever 23, and although the pressure is increased due to the smaller displacement the prime mover is not called upon to deliver so much power thus reducing the possibility of stalling the engine. If the power control of the prime mover is operated to give more power, i.e. to run at a higher speed for the same displacement of control lever 23 there will be no substantial alteration in the setting of the cam 29 and the amount of overriding action exerted against the lever 23 on pump displacement. It will be seen that apart from the possibility of stalling the engine that the loading impressed on the spring 36 is at all times appropriate to the selected displacement and at all times if an excessive high pressure is developed then the action automatically is to reduce pump displacement to reduce the amount of circulated liquid and automatically to adjust the transmission so as to absorb the power generated by the prime mover in the most useful possible manner.

A further advantage of a hydraulic transmission is that braking of the vehicle or tractor carrying the transmission may be easily effected merely by reducing the displacement of the main pump and for emergency braking the displacement may be reduced to zero although the transmission or prime mover may then possibly be damaged. To prevent excessive damage when braking it is necessary to prevent the use of reverse displacement and this is effected in the following manner. When braking of the vehicle is being effected high pressure is developed in the other of the pipe lines 3 or 4 than that which was under pressure during driving in the same direction of movement. Taking the previous example with the hand control lever displaced to the right then during braking the pipe line 4 is under pressure. This pressure is transmitted through pipe 43 to piston 41 and when this pressure becomes sufficiently high, hydraulic liquid is passed through passage 45, valve 47 to cylinder 58 to act on the piston 61 pushing it out to stop 60 thus preventing the cam 29 and rod 22 being moved to a displacement position of the opposite sense.

The piston 41, spring 36, piston 61 and cylinder 58 then form the third pressure sensitive means. Where operation of the transmission requires that the hand control lever is displaced to the left for backward tractor movement the piston 41, spring 36, piston 61 and cylinder 58 then become the first pressure sensitive means since they act to prevent selection of excessively large pump displacements. The piston 42, spring 36, piston 62 and cylinder 59 will then form the third pressure sensitive means since their action prevents selection of a forward displacement during braking.

Since the vehicles on which the transmission is used operate under varying conditions which result in variation of adhesion between the road engaging wheels and the road or equivalent it will be appreciated that on many occasions the driving torque that can be exerted on the driving wheels is in excess of the adhesion with the result that the driving wheels will slip. Such a condition is clearly undesirable, but is difficult to sense hydraulically because it represents a substantially ordinary running condition of the vehicle. However, to guard against wheel slip as much as possible there is provided in the described embodiment a pair of valves 63 and 64 which are adjustably spring-loaded. Either of valves 63 or 64 form the second pressure sensitive means. The pressures at which the valves 63 and 64 will open are arranged to be within the higher pressure range of the operative pressures in which plunger 35 is depressed to cause correcting operation on cam 29. In this way in the condition where a high torque could normally be exerted if a valve 63 or 64 is allowed to open at a slightly lower pressure then correcting action will take place on the cam 29 to cause almost complete reduction of the displacement of pump 1 to a zero value. By adjusting the control on the spring loadings of the valves 63 and 64 in accordance with the conditions it can be arranged that the torque developed on the driving wheels cannot exceed a certain value. If, for example, the transmission is on an agricultural tractor being driven over muddy ground the valves 63 and 64 will be set to a comparatively low pressure which will prevent slipping of the tractor driving wheels and thus prevent these wheels from spinning in the mud and bogging the tractor down. With the valves 63 and 64 in operation to prevent wheel slip it will be appreciated that where the load to be pulled has considerable inertia then, assuming that movement can be started, the drive available will be sufficient to keep the load moving.

We claim as our invention:

1. A hydraulic power transmission for use between a prime mover and a mechanical load comprising a variable positive displacement pump driven by the prime mover, a positive displacement motor driving the mechanical load, a flow conduit to feed pumped pressure liquid from the pump to the motor, manual means to control pump displacement, a first pressure sensitive means fed with pump output pressure to act on the pump displacement and to override the manual control to reduce pump displacement if the pump pressure exceeds a certain value, and means variable with pump displacement to increase the said certain value of pump pressure as pump displacement reduces.

2. A hydraulic power transmission as claimed in claim 1 including a second pressure sensitive means fed with pump output pressure to act on the pump displacement and to override both the manual control and the first pressure sensitive means to reduce pump displacement if the pressure exceeds a predetermined value, this predetermined value being preset to a value of the said certain pressure.

3. A transmission as claimed in claim 2 the flow conduit including a supply conduit from the pump to the motor and a return conduit to carry liquid from the motor to the pump, a third pressure sensitive means connected to receive the pressure developed when the motor is driving the pump and prime mover and operative to prevent the selection of an excessively reduced pump displacement.

4. A transmission as claimed in claim 3, wherein the pump is capable of reversed displacement, the first pressure sensitive means being connected to one of the supply and return conduits and the third pressure sensitive means being connected to the other such conduit whereby their functions are automatically reversed with reversal of the selected pump displacement.

5. A hydraulic power transmission for use between a prime mover and a mechanical load comprising a reversible variable positive displacement pump driven by the prime mover, a positive displacement motor driving the mechanical load, flow and return conduits to carry pumped pressure liquid from pump to motor and return liquid from motor to pump, a pump displacement control, manual means to operate this displacement control, a spring interposed between the manual means and the pump displacement control, a double-acting ram arrangement directly acting on the pump displacement control, a cam movable with the pump displacement control, a pair of spring-loaded valves connected one to each conduit, spring means loading said valves in the closing sense, adjusting means interconnecting the cam and the spring loading to reduce the latter with increase in pump displacement from zero, and connections from the spring-loaded valves to the double-acting ram arrangement such that excessive pressure in a conduit over that determined by the cam position will cause the spring-loaded valve connected to that conduit to open to allow pressure liquid to flow to one end of the double-acting ram arrangement to move the pump displacement control to a smaller displacement, overriding the operation of the manual control by variation of the length of said spring.

6. A transmission as claimed in claim 5, wherein the double-acting ram arrangement comprises a pair of opposed single-acting rams each capable when fed with liquid pressure of urging the pump displacement control to a central position representing zero pump displacement and a stop associated with each ram preventing movement of the pump displacement control by either ram from one displacement direction through zero displacement to the opposite displacement such that for one direction of selection of pump displacement by the manual control one spring-loaded valve and the associated single-acting ram serve to prevent an overlarge displacement selection on development of excessive pressure in one conduit whilst under conditions where the motor drives the pump the other spring-loaded valve will operate on development of excessive pressure in the other conduit to move the ram out to its stop to prevent selection of a reversed displacement.

7. A transmission as claimed in claim 6 including a pair of adjustably present spring-loaded valves operative at pressures within the range of adjustment of the first-mentioned spring-loaded valves connected one to each conduit and feeding respectively one to each single-acting ram whereby on excessive pressure over the preset value developing in a conduit the appropriate single-acting ram is fed with pressure liquid which will move the pump displacement control to zero displacement, overriding the operation of the manual control by variation in the length of the said spring.

8. A hydraulic power transmission as claimed in claim 5, wherein the pair of spring-loaded valves comprise a single spring loading, a pair of parallel bores, a plunger in each bore extending towards and capable of compressing the spring loading on supply of liquid pressure to its bore, and a port in each bore connected to opposite ends of the double-acting ram arrangement, the two bores being respectively in connection with the said flow and return conduits whereby excessive pressure in either conduit will cause depression of the appropriate plunger against the spring loading to open the port in the bore to supply liquid pressure to the double-acting ram arrangement.

9. A hydraulic power transmission as claimed in claim 5, wherein the said connections from the spring-loaded valves to the double-acting ram arrangement each include a vent valve comprising a cylinder, a piston, a spring urging the piston to one end of the cylinder, ports spaced longitudinally along the cylinder adapted to be covered and uncovered by the piston, a connection from the spring-loaded valve to the end of the cylinder to which the piston is urged by the spring and connections from said ports to low pressure and to the double-acting ram arrangement so arranged that when no pressure is supplied from the spring-loaded valve the piston is urged by its spring to uncover and join together the ports leading to low pressure and the double-acting ram arrangement whereby the latter is deenergized, and when pressure is supplied from the spring-loaded valve the piston is moved against its spring to cover the low pressure port and to connect the said pressure to the port leading to the double-acting ram arrangement.

References Cited in the file of this patent

UNITED STATES PATENTS

| | | |
|---|---|---|
| 1,974,138 | Ferris et al. | Sept. 18, 1934 |
| 2,093,690 | Wiedmann | Sept. 21, 1937 |
| 2,240,898 | Wiedmann | May 6, 1941 |
| 2,381,795 | Willett | Aug. 7, 1945 |

UNITED STATES PATENT OFFICE

CERTIFICATE OF CORRECTION

Patent No. 2,896,411                         July 28, 1959

Eric H. Bowers et al.

It is hereby certified that error appears in the above numbered patent requiring correction and that the said Letters Patent should read as corrected below.

In the grant, lines 2, 3, and 4, for "assignors to Dowty Hydraulic Units Limited, of Tewkesbury, England, and Oswald Thoma, of Grunwald uber Munich, Germany," read -- assignors to Dowty Hydraulic Units Limited, of Tewkesbury, England, --; lines 13 and 14, for "Dowty Hydraulic Units Limited, its successors or assigns, and Oswald Thoma, his heirs" read -- Dowty Hydraulic Units Limited, its successors --; in the heading to the printed specification, lines 4, 5, 6 and 7, for "assignors to Dowty Hydraulic Units Limited, Tewkesbury, England, and Oswald Thoma, Grunwald uber Munich, Germany" read -- assignors to Dowty Hydraulic Units Limited, Tewkesbury, England --; column 7, line 2, for "present" read -- preset --.

Signed and sealed this 15th day of March 1960.

(SEAL)

Attest:

KARL H. AXLINE

Attesting Officer

ROBERT C. WATSON
Commissioner of Patents